United States Patent
Ohmura

(10) Patent No.: US 7,170,616 B2
(45) Date of Patent: Jan. 30, 2007

(54) PRINT PROCESSING AND METHOD FOR BANDING AREAS AND PAGES OF EACH PHYSICAL COLOR

(75) Inventor: Hiroshi Ohmura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 741 days.

(21) Appl. No.: 10/322,745

(22) Filed: Dec. 19, 2002

(65) Prior Publication Data
US 2003/0117649 A1 Jun. 26, 2003

(30) Foreign Application Priority Data
Dec. 26, 2001 (JP) ............................ 2001-394621

(51) Int. Cl.
*G06F 3/12* (2006.01)
(52) U.S. Cl. .................................... 358/1.13
(58) Field of Classification Search ..................... None
See application file for complete search history.

(56) References Cited

U.S. PATENT DOCUMENTS 5,268,995 A * 12/1993 Diefendorff et al. ........ 345/422
6,492,987 B1 * 12/2002 Morein ........................ 345/422
6,718,878 B2 * 4/2004 Grosso et al. ............... 101/484
6,995,852 B1 * 2/2006 Urasawa ..................... 358/1.15

* cited by examiner

*Primary Examiner*—Mark Zimmerman
*Assistant Examiner*—Vincent M. Rudolph
(74) *Attorney, Agent, or Firm*—Fitzpatrick, Cella Harper & Scinto

(57) ABSTRACT

To reduce a calculation load upon banding reproduction, a printer driver transfers draw information sent from a GDI to a draw discriminating unit. The draw discriminating unit confirms that a filtering process which needs various background colors such as ROM process or α blending process is not included for the drawing images constructing an intermediate language. The printer driver transfers the draw information included in an area of one page to a drawing unit. The drawing unit issues a physical color converting request of color information included in the drawing image to a color converting unit. In response to the physical color converting request of the color information included in the drawing image issued from the drawing unit, the color converting unit transfers information of only a physical color component which is at present being processed from the color information included in the drawing image to the drawing unit.

9 Claims, 7 Drawing Sheets

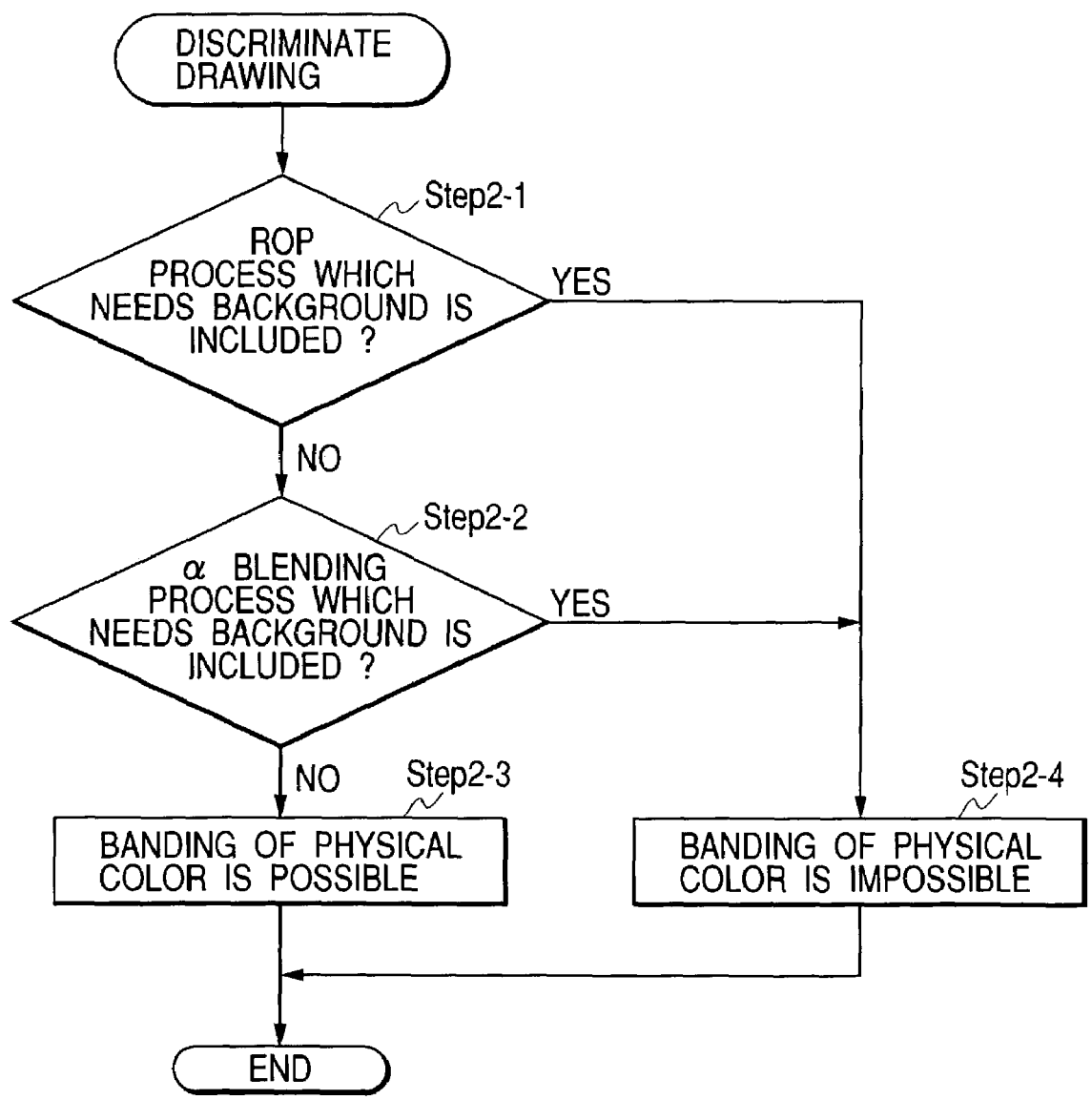

EXAMPLE OF DRAWING

BAND MEMORY FOR EACH PHYSICAL COLOR

EXAMPLE OF DRAWING

BAND MEMORY HAVING ALL PHYSICAL COLORS

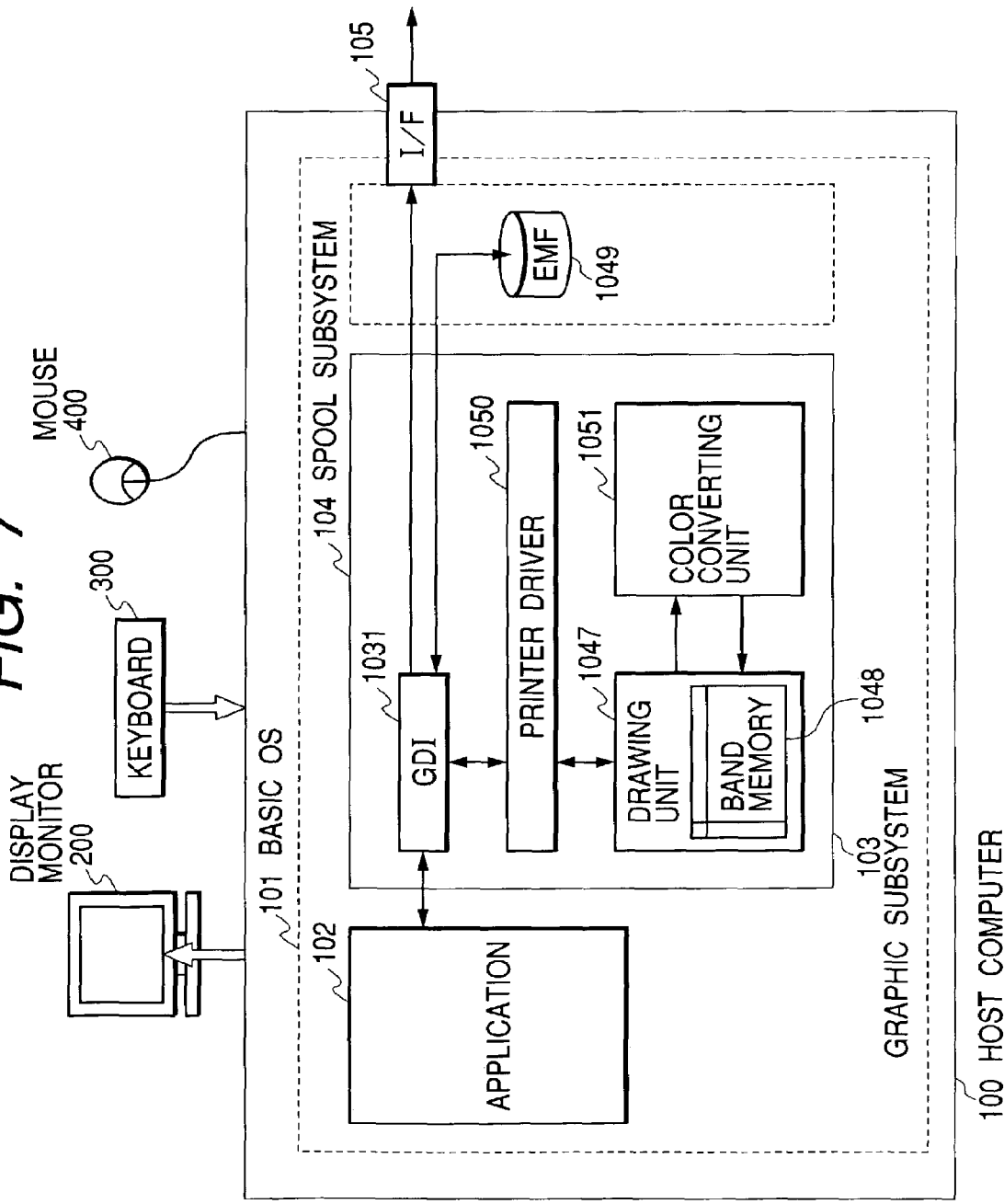

PRINT PROCESSING AND METHOD FOR BANDING AREAS AND PAGES OF EACH PHYSICAL COLOR

BACKGROUND OF THE INVENTION

1. Field of the Invention

The invention relates to a print processing apparatus and, more particularly, to a print processing apparatus which can be applied to a print system or the like constructed by connecting a printing apparatus and a data processing apparatus via a predetermined communication medium.

2. Related Background Art

FIG. 7 is a block diagram showing a fundamental construction of a whole conventional print processing apparatus. Generally, as shown in FIG. 7, a host computer 100 is connected to a printing apparatus via parallel communicating means such as a Centronics interface or the like or an external I/F (interface) 105 serving as network communicating means, thereby constructing the print processing apparatus.

In the host computer 100, application software (hereinafter, referred to as an application) 102 such as word processor or spreadsheet is operating on what is called basic software 101 such as Windows (registered trademark of Microsoft Corporation in U.S.A.). In the case of printing from the application 102 as mentioned above, a function of a graphic subsystem 103 among subsystems which are provided by the basic software 101 in a program is used.

The graphic subsystem 103 is called GDI (Graphic Device Interface) 1031 in, for example, Windows (registered trademark) and executes a process of image information for a display or a printer. The GDI 1031 dynamically links a module called a device driver in order to absorb dependence of each display device such as display 200 or printer and executes an outputting process to each device.

The module for the printer is particularly called a printer driver 1050. In the printer driver 1050, it is necessary to prepare a function group called DDI (Device Driver Interface) which has been predetermined so as to be implemented into the device driver in accordance with its ability, function, or the like. The GDI 1031 converts an API (Application Programming Interface) call of the application into data for the device driver. The DDI function group is properly called from the GDI 1031 and a predetermined drawing process is executed. In the GDI 1031, a print request from the application is sequentially processed via the printer driver as mentioned above.

A processing system shown in FIG. 7 shows the operation of an image system drawing process for developing a draw command received via the DDI function group of the conventional type into a bit map on the host side and sending it to the printing apparatus.

In the image system drawing process, in order to develop the draw command received via the DDI function group into the bit map, a drawing unit 1047 is built in the host side.

In order to develop the draw command received via the DDI function group into a bit map, a memory area for development is necessary. Generally, since it is difficult to obtain a memory for one page on the host side, a memory called a band memory 1048 whose capacity is less than that of one page is obtained and each draw command of one page is divided a plurality of number of times and developed. Such a process is called a banding process.

As a conventional method of realizing the banding process, EMF banding executed in Windows (registered trademark) will be described. An intermediate file called an EMF file 1049 shown in FIG. 7 is formed, all draw commands in the EMF file 1049 are searched every band a plurality of number of times, only a drawing image corresponding to the band is received and transferred to the drawing unit 1047, and the drawing image of the band portion in one page is developed into the band memory and transferred to the printer.

FIG. 6 is a diagram showing a flowchart for the EMF banding process.

Step 3-1:

In response to the draw command of the application, the GDI 1031 forms the EMF file 1049 for recording each draw command. Each draw command has been recorded in the EMF file 1049 from the head of the file in correspondence to drawing order. A circumscribed rectangle information in a drawing range of the draw command has been recorded in a record of each draw command.

Step 3-2:

The GDI 1031 inquires of the printer driver 1050 about a band position in the page. The printer driver 1050 answers the band position in the page in consideration of the band memory 1048 obtained by the drawing unit 1047.

If the printer driver 1050 wants to finish the banding process in the page, it answers $(x, y)=(-1, -1)$ as a special position as a left top position of a band rectangle.

Step 3-3:

If the band position notified from the printer driver 1050 is $(x, y)=(-1, -1)$, the processing routine is finished. In the other cases, a process in step 3-4 is executed.

Step 3-4:

The present draw command in the EMF file 1049 is set to the 0th element. The 0th draw command is a one-preceding element of the draw command stored at the head of the EMF file 1049 and is an element which does not actually exist.

Step 3-5:

The next draw command in the direction from the head to the last on the EMF file 1049 is set to the present draw command.

Step 3-6:

Whether the circumscribed rectangle information of the present draw command overlaps with a range of the band notified from the printer driver 1050 or not is discriminated. If it overlaps, the draw command needs to be drawn in the present band and belongs to the present band.

If the present draw command belongs to the present band, step 3-7 follows. If the present draw command does not belong to the present band, step 3-8 follows.

Step 3-7:

Draw information of the present draw command is transferred to the drawing unit 1047 via the GDI 1031 and the printer driver 1050 and drawn in the band memory 1048. At this time, a relative correcting process of a band coordinate origin and a coordinate origin in the page is executed to the draw information concerned with the position of the present draw command in a manner such that when each band is arranged, a drawing image of one page is correctly constructed.

Step 3-8:

Whether the present draw command is an END element indicative of the end of drawing or not is discriminated.

If the present draw command is the END element, step 3-2 follows.

If the present draw command is not the END element, step 3-5 follows.

By using the foregoing EMF banding process, the drawing images in the intermediate language belonging to a partial space of the page designated from the printer driver 1050 can be reproduced in drawing order.

According to the conventional technique, as shown in FIGS. 5A and 5B, by using the foregoing EMF banding process, a drawing image 500 of one page is spatially divided in accordance with the sizes which can be obtained on the host of band memories 510, 520, 530, and 540 having planes of physical colors which the printing apparatus has, reproduction is executed by using the EMF banding every space, and a drawing developing process is executed to the band memories. A banding system of reproducing by spatially dividing the page is called a spatial banding hereinbelow.

In the case of FIGS. 5A and 5B, the physical colors which the printing apparatus has are yellow, magenta, cyan, and black, and the planes in the band memories are indicated by reference numerals 510, 520, 530, and 540, respectively. As a band memory which is used for the drawing reproduction of each dividing space of one page, the memory obtained upon first reproduction is reused. By reproducing the coordinates of each dividing space by the EMF banding process, the drawing images on the band memories having all physical colors which the printing apparatus has are completed by the banding process of one time.

For example, since a cyan ellipse drawing image 502 and a magenta straight line drawing image 503 are included in the top dividing area of the page, the ellipse drawing image 502 is drawn in the cyan plane 530 and the straight line drawing image 503 is drawn in the magenta plane 520 in the band memory of this dividing area. At this time, the color of the area in a shape of the magenta straight line drawing image 503 is eliminated in the ellipse drawing image 502 of the cyan plane in accordance with the drawing order.

The foregoing conventional banding realizing method has the following problems. The first problem is that since the drawing image of one page is divided into a plurality of spaces and banding processed, it is necessary to execute a coordinate converting process of each band to the drawing images constructing the intermediate language and a calculation load is caused upon reproduction.

The second problem is that since the intermediate language is developed into the band memories having all of the physical color planes which the printing apparatus has, when the band memories after completion of the drawing development are provided for the printing apparatus such as a laser beam printer or the like constructed by one drum which transfers the color onto the drum or an intermediate transfer material every physical color and reproduces, it is necessary to reconstruct information of one page every physical color plane. It is necessary to keep memory means for such reconstruction. Reproduction start time is delayed by the reconstructing process.

SUMMARY OF THE INVENTION

The invention is made in consideration of the above problems and it is an object of the invention to provide a print processing apparatus in which as compared with the spatial banding such that a drawing image of one page is divided into a plurality of spaces and banding is executed, there is no need to execute a coordinate converting process of each band to drawing images constructing an intermediate language, thereby enabling a calculation load upon banding reproduction to be reduced.

To accomplish the above object, according to the invention, if a specific condition in which an intermediate language exists is satisfied, banding of each physical color which the printing apparatus has is executed by using the following means.

According to the invention, there is provided a print processing method in a print processing apparatus in which a printing apparatus and a data processing apparatus are connected via a predetermined communication medium, comprising: a spooling step of converting a draw command which is transferred from basic software into an intermediate language in a format in which it can be stored; an intermediate language storing step of holding the intermediate language formed by the spooling step; a reproducing step of extracting the intermediate language from the intermediate language storing step and executing banding reproduction a plurality of number of times; a drawing step of draw-developing a draw command of the intermediate language transferred from the reproducing step; a band memory storing step in which the intermediate language is draw-developed by the drawing step; and a draw discriminating step of discriminating whether a specific condition in which the intermediate language exists is satisfied or not, wherein if it is determined by the draw discriminating step that the specific condition in which the intermediate language exists is satisfied, a banding process is executed every physical color which the printing apparatus has.

As a specific condition in which the intermediate language exists, there is set a condition such that it is constructed only by a drawing image which does not need to obtain background information.

As a drawing image which does not need to obtain the background information, there is set a condition such that a filtering process which needs various background colors such as ROP (Raster Operation) process, α blending process, or the like which needs the background is not included in the intermediate language.

According to the invention, there is provided a print processing apparatus in which a printing apparatus and a data processing apparatus are connected via a predetermined communication medium, comprising: spooling means for converting a draw command which is transferred from basic software into an intermediate language in a format in which it can be stored; intermediate language storing means for holding the intermediate language formed by the spooling means; reproducing means for extracting the intermediate language from the intermediate language storing means and executing banding reproduction a plurality of number of times; drawing means for draw-developing a draw command of the intermediate language transferred from the reproducing means; band memory storing means in which the intermediate language is draw-developed by the drawing means; and draw discriminating means for discriminating whether a specific condition in which the intermediate language exists is satisfied or not, wherein if it is determined by the draw discriminating means that the specific condition in which the intermediate language exists is satisfied, a banding process is executed every physical color which the printing apparatus has.

As a specific condition in which the intermediate language exists, there is set a condition such that it is constructed only by a drawing image which does not need to obtain background information.

As a drawing image which does not need to obtain the background information, there is set a condition such that a filtering process which needs various background colors such as ROP (Raster Operation) process, α blending process, or the like which needs the background is not included in the intermediate language.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a flowchart showing draw discriminating means of the invention;

FIGS. 4A and 4B are schematic diagrams showing physical color banding reproduction of the invention, in which FIG. 4A is a diagram showing a draw example and FIG. 4B is a diagram showing a band memory of each physical color;

FIGS. 5A and 5B are schematic diagrams showing spatial banding reproduction of a conventional technique, in which FIG. 5A is a diagram showing a draw example and FIG. 5B is a diagram showing a band memory having all physical colors;

FIG. 7 is a block diagram showing a fundamental construction of a whole print processing apparatus of the conventional technique.

DETAILED DESCRIPTION OF THE PREFERRED EMBODIMENTS

An embodiment of the invention will be described hereinbelow with reference to the drawings.

Figure 1:
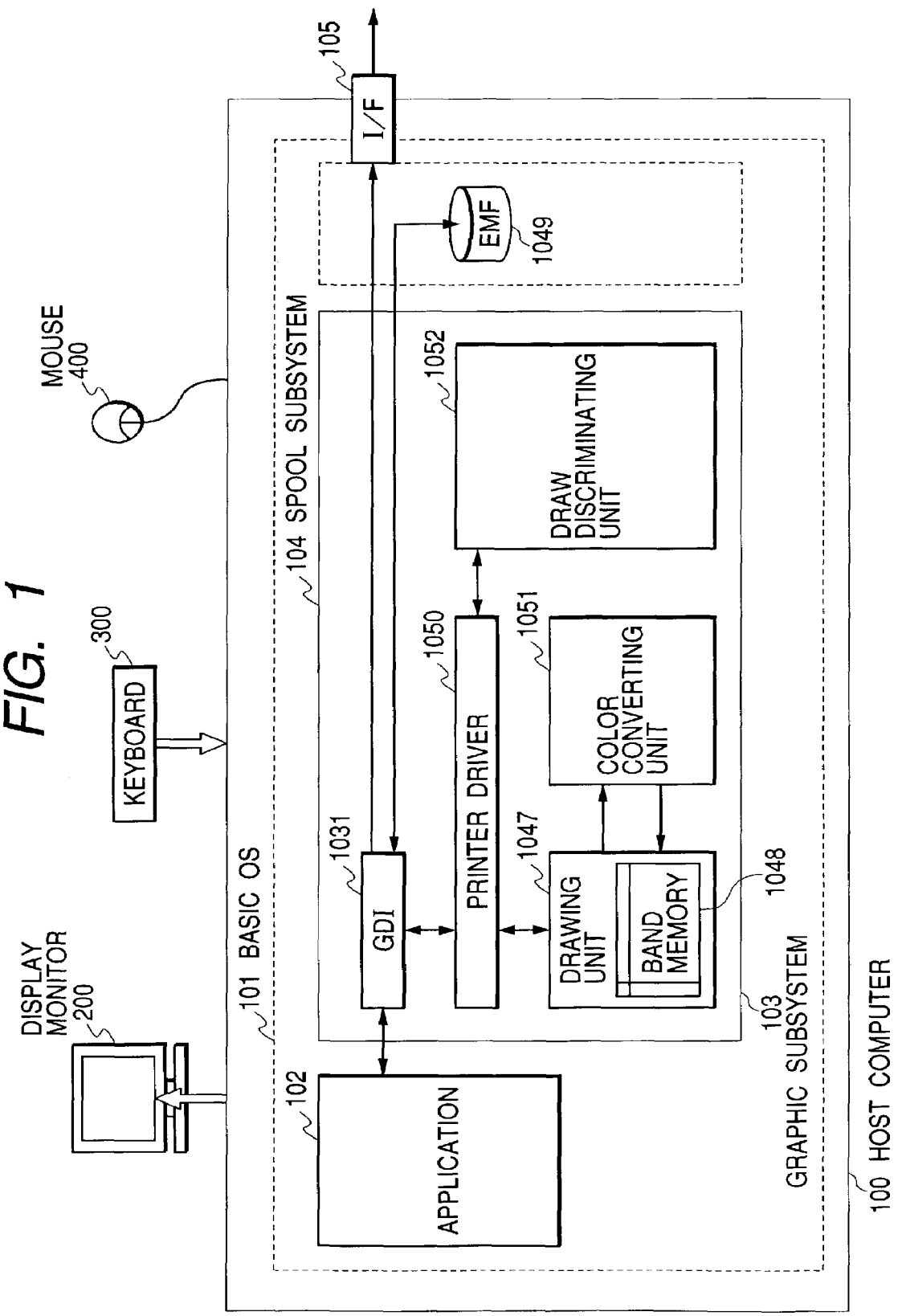
FIG. 1 is a block diagram showing a fundamental construction of a whole print processing apparatus of the invention.

FIG. 1 is a diagram showing a system construction in the case of using EMF banding according to an embodiment of a print processing apparatus of the invention.

In FIG. 1, the following component elements are added to the conventional system construction shown in FIG. 7. That is, a draw discriminating unit 1052 for discriminating whether banding can be performed in a physical color or not and an information line showing a physical color which is at present being banding processed from the printer driver 1050 for controlling the banding to a color converting unit 1051.

Figure 4A:
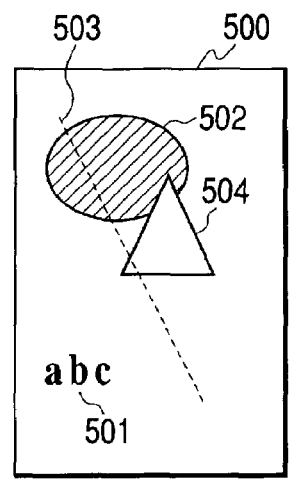
Figure 4B:
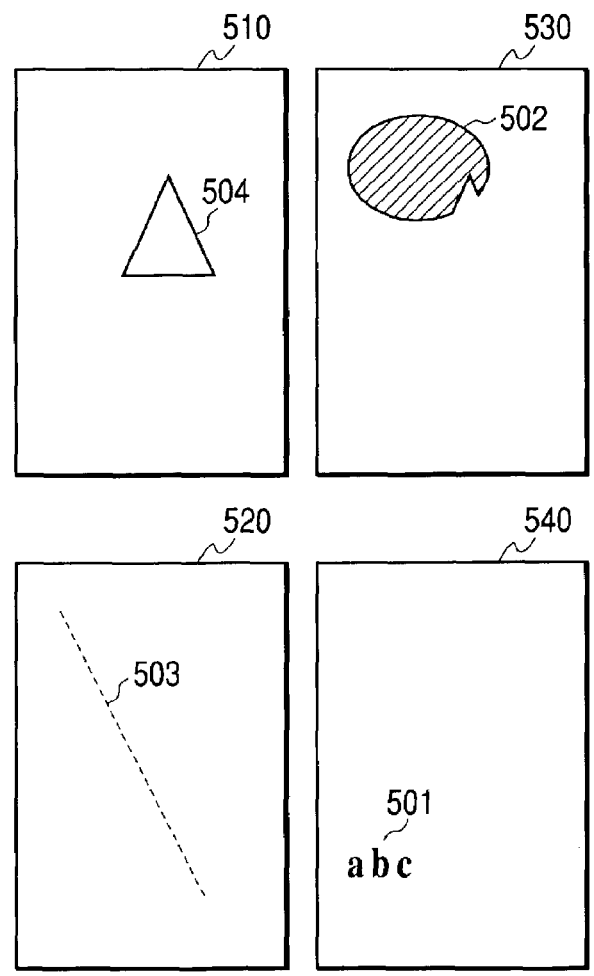

FIGS. 4A and 4B are diagrams showing an example of physical color banding in the case where the foregoing specific condition is satisfied. FIG. 4A shows a draw example and FIG. 4B shows a band memory of each physical color. After the transfer to a printing apparatus, the band memory can be reused for the next banding process. Therefore, the band memories 510, 520, 530, and 540 in FIG. 4B are the same memory and the same memory is reused upon reproduction of each physical color banding. The present physical color is defined in this band memory and a drawing image of a page is completed into the band memory every physical color.

If a filtering process which needs various background colors such as ROP (Raster Operation) process, α blending process, or the like which needs the background is not included for the drawing images constructing an intermediate language, since color pixels of the background color are unnecessary, even if the banding process is independently executed every physical color, no trouble is caused. Therefore, even if the drawing is executed every physical color into the band memory for one page of the physical color and drawing images are successively transferred to the printing apparatus, no trouble is caused in the drawing process.

Figure 5A:
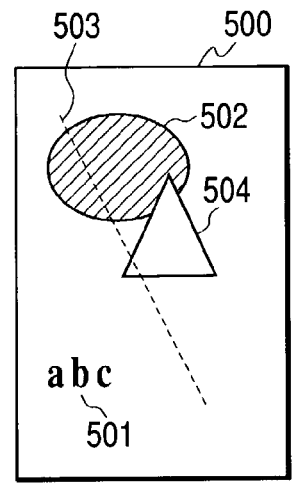
Figure 5B:
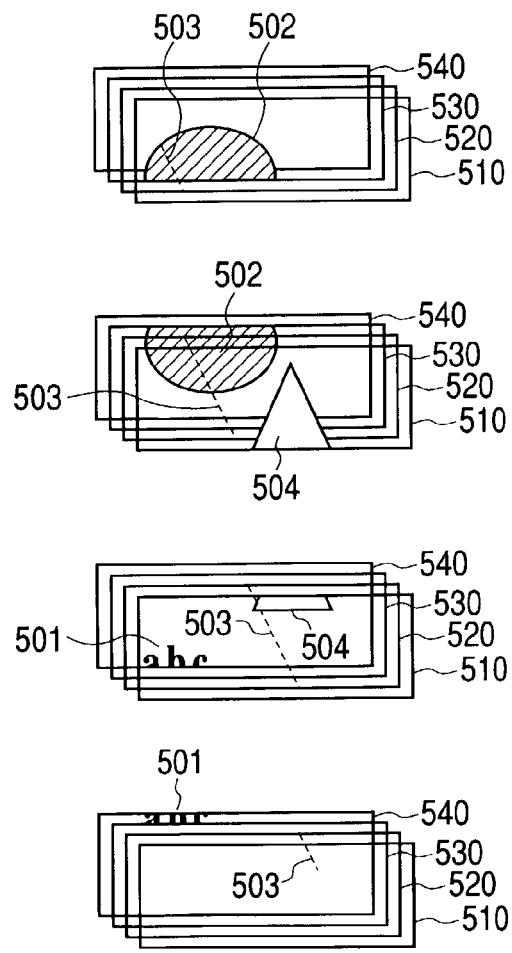
Figure 6:
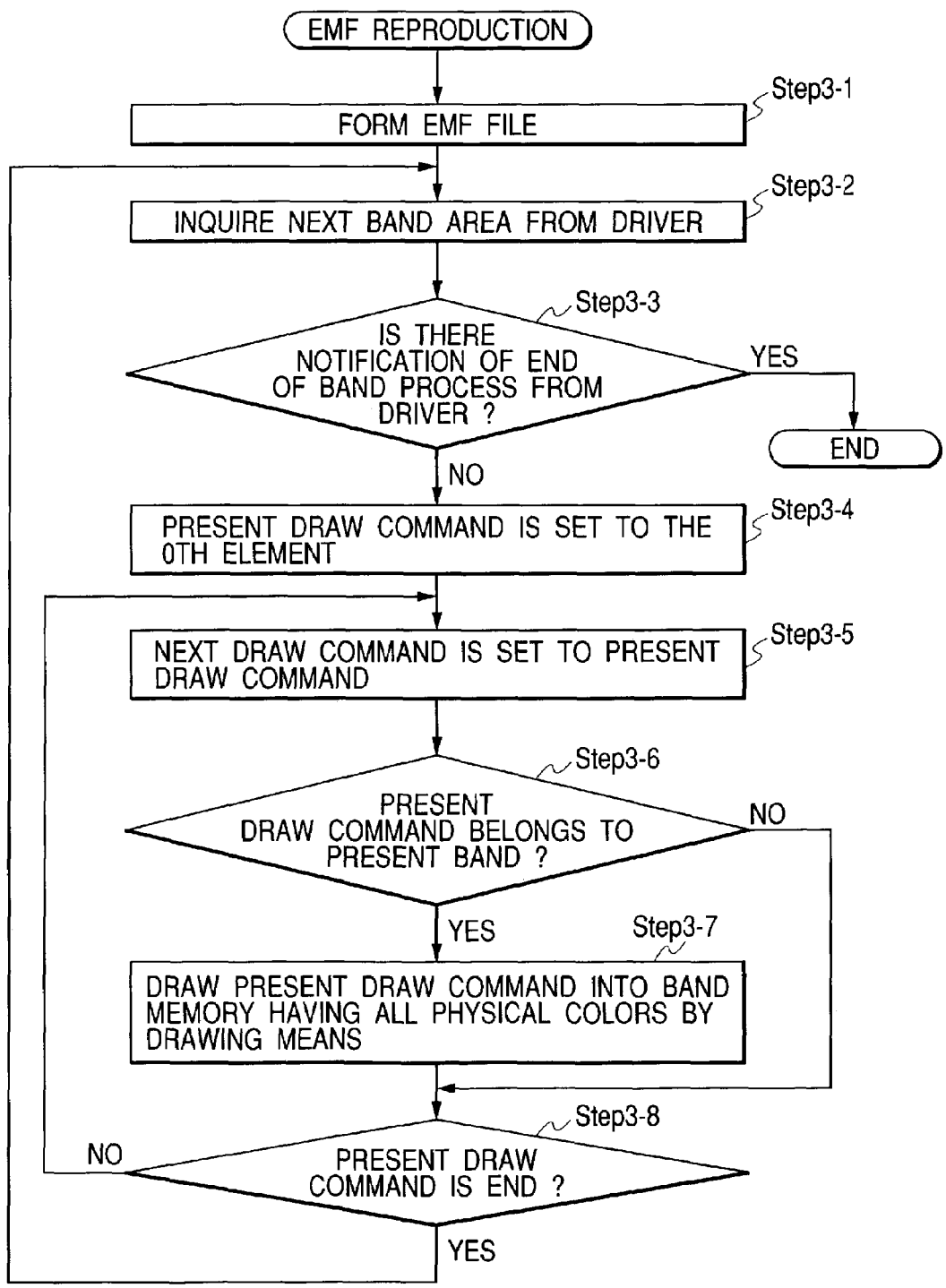
FIG. 6 is a flowchart showing EMF reproduction.

In the printing apparatus of one drum or the like, since the physical color order adapted to the drum or the intermediate transfer material has been predetermined, by forming plane information of the physical colors in transferring order of the physical color draw information which is optimum to the printing apparatus, a process for rearrangement or the like of the plane information for getting physical planes of one page which are necessary upon spatial banding in FIGS. 5A and 5B can be omitted.

If the intermediate language does not satisfy the foregoing specific condition, since this case corresponds to a case where the drawing image needs information of a background color and all color information of the background color is necessary upon drawing of each band, ordinary banding reproduction in which one page is spatially divided is applied.

Processes of the invention will now be explained in print processing order with reference to FIG. 1. For simplicity of explanation, a case where the band memory (510, 520, 530, or 540) for one physical color shown in FIG. 4B can be obtained on the host will be described hereinbelow. After transferring to the printing apparatus, the band memory can be reused for the next banding process. Therefore, the band memories 510, 520, 530, and 540 in FIG. 4B are the same memory and the same memory is reused upon reproduction of each physical color banding. With respect to the band memory (510, 520, 530, or 540) for one physical color, processes which are executed in the case where such a band memory cannot be obtained on the host will be disclosed in another explanation.

Upon initial setting of the printer driver 1050, it is preset in the GDI 1031 so as to form an EMF file upon printing. The GDI 1031 forms the intermediate language as an EMF file 1049 in response to a print request from the application 102. The printer driver 1050 requests the execution of the EMF banding by setting a draw possible area of one page to one band. The printer driver 1050 receives the draw information constructing one page in drawing order from the GDI 1031.

The printer driver 1050 transfers the draw information sent from the GDI 1031 to the draw discriminating unit 1052. In accordance with a flowchart shown in FIG. 3, the draw discriminating unit 1052 confirms that the filtering process which needs various background colors such as ROP (Raster Operation) process, α blending process, or the like which needs the background is not included for the drawing images constructing the intermediate language.

<When the Physical Color Banding of the Invention is Applied>

If the filtering process which needs various background colors such as ROP (Raster Operation) process, α blending process, or the like which needs the background is not included for the drawing images constructing the intermediate language, since the color pixels of the background color are unnecessary, even if the banding process is independently executed every physical color, no trouble is caused.

If the foregoing condition is satisfied, the printer driver 1050 requests the GDI 1031 to execute the band reproduction of the area of one page the number of times corresponding to the number of physical colors. Before the draw information included in the area of one page is sent to the drawing unit 1047, the printer driver 1050 confirms for which physical color the present band is executing the process, and designates the physical color which is at present being processed into the color converting unit 1051.

After that, the printer driver 1050 sends the draw information included in the area of one page which is supplied from the GDI 1031 to the drawing unit 1047. The drawing unit 1047 generates a physical color converting request of the color information included in the drawing image to the color converting unit 1051. In response to the physical color converting request of the color information included in the drawing image issued from the drawing unit 1047, the color converting unit 1051 transfers information of only a physical color component which is at present being processed from the color information included in the drawing image to the drawing unit 1047.

In the printing apparatus of one drum or the like, since the physical color order adapted to the drum or the intermediate transfer material has been predetermined, by forming plane information of the physical colors in transferring order of the physical color draw information which is optimum to the printing apparatus, the process for rearrangement or the like of the planes can be omitted.

<When the Ordinary Spatial Banding is Applied>

If the filtering process which needs various background colors such as ROP (Raster Operation) process, α blending process, or the like which needs the background is included for the drawing images constructing the intermediate language, since the color pixels of the background color are necessary, the plane information of all of the physical colors is necessary. In the case of this condition, the ordinary spatial banding is applied.

Figure 2:
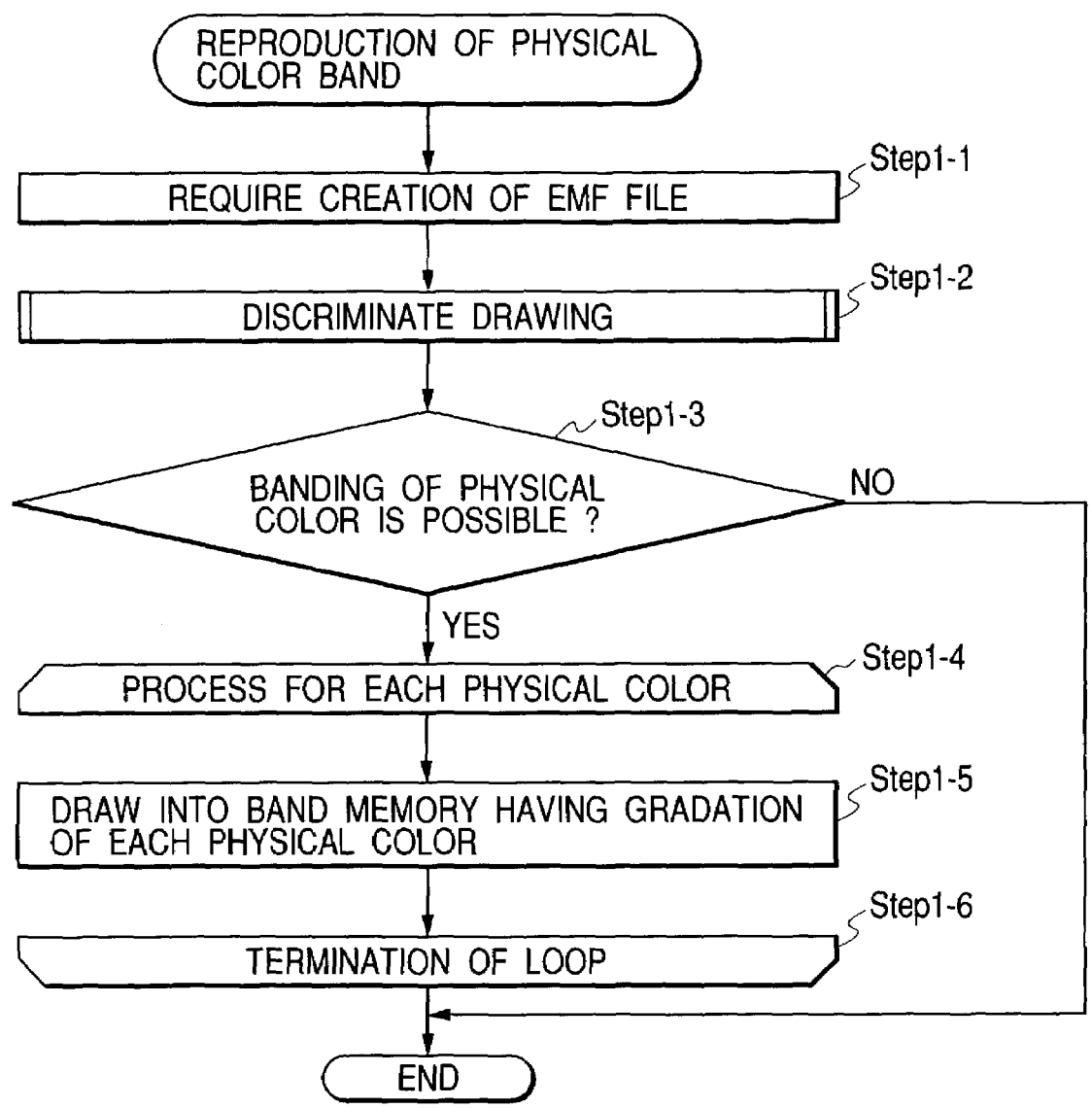
FIG. 2 is a flowchart showing a banding reproducing process of the invention.

FIG. 2 is a diagram for explaining a processing flow in the case where the physical color banding is possible with reference to flowcharts showing the banding reproducing process of the invention.

Step 1-1:

At the time of the initial setting of the printer driver 1050, the GDI 1031 is preset so as to form the EMF file upon printing. The GDI 1031 forms an intermediate file called an EMF file 1049 in response to a print request from the application 102.

Step 1-2:

The printer driver 1050 requests the execution of the EMF banding by setting a draw possible area of one page to one band. The printer driver 1050 receives the draw information constructing one page from the GDI 1031 in drawing order. The printer driver 1050 supplies the draw information transferred from the GDI 1031 to the draw discriminating unit 1052. In accordance with the flowchart shown in FIG. 3, the draw discriminating unit 1052 confirms that the filtering process which needs various background colors such as ROP (Raster Operation) process, a blending process, or the like which needs the background is not included for the drawing images constructing the intermediate language.

Step 1-3:

If the physical color banding is possible, step 1-4 follows. If the physical color banding is impossible, the processing routine advances to END. After END, the ordinary spatial banding process is executed.

Step 1-4:

The printer driver 1050 executes a loop for requesting the GDI 1031 to execute the band reproduction of the area of one page the number of times corresponding to the number of physical colors and reproducing the draw information of the intermediate language included in one page every physical color.

Step 1-5:

Before the draw information included in the area of one page is transferred to the drawing unit 1047, the printer driver 1050 confirms for which physical color the present band is executing the process, and designates the physical color which is at present being processed into the color converting unit 1051. After that, the printer driver 1050 sends the draw information included in the area of one page which is supplied from the GDI 1031 to the drawing unit 1047.

The drawing unit 1047 generates a physical color converting request of the color information included in the drawing image to the color converting unit 1051. In response to the physical color converting request of the color information included in the drawing image issued from the drawing unit 1047, the color converting unit 1051 transfers information of only a physical color component which is at present being processed from the color information included in the drawing image to the drawing unit 1047.

Step 1-6:

Termination of the loop.

FIG. 3 is a flowchart showing the operation of the draw discriminating unit in the case of the embodiment.

Step 2-1:

Whether the ROP information is included in the drawing image of one page and the ROP which needs the background information is included or not is discriminated.

If it is determined that the ROP information is included in the drawing image of one page and the ROP which needs the background information is included, step 2-4 follows.

If it is determined that the ROP information is not included in the drawing image of one page or the ROP which needs the background information is not included, step 2-2 follows.

Step 2-2:

If the α blending which needs the background information is included in the drawing image of one page, step 2-4 follows.

If the α blending which needs the background information is not included in the drawing image of one page, step 2-3 follows.

Step 2-3:

If the filtering process which needs various background colors such as ROP (Raster Operation) process, α blending process, or the like which needs the background is not included for the drawing images constructing the intermediate language, since the color pixels of the background color are unnecessary, even if the banding process is independently executed every physical color, no trouble is caused. Therefore, a flag indicating that the physical color banding is possible is set to the high level.

Step 2-4:

If the filtering process which needs various background colors such as ROP (Raster Operation) process, α blending process, or the like which needs the background is included for the drawing images constructing the intermediate language, since the color pixels of the background color are necessary, the plane information of all of the physical colors is necessary. In the case of this condition, a flag indicating that the physical color banding is impossible is set to the high level.

In the case of the embodiment, although the invention has been limited to the ROP information and the α blending process which need the background information, if the filtering process which needs the background is included in the drawing image of one page, the physical color banding should not be executed.

FIGS. 4A and 4B are diagrams showing an example of the physical color banding in the case where the specific condition is satisfied as mentioned above. After transferring to the printing apparatus, the band memory can be reused for the next banding process. Therefore, the band memories 510, 520, 530, and 540 in FIG. 4B are the same memory and the same memory is reused upon reproduction of each physical color banding. The present physical color is defined in this band memory and the drawing image of the page is completed into the band memory every physical color.

For example, upon reproduction of the yellow band, planes 501 to 504 are drawn and only the yellow triangle drawing image having a yellow element is drawn on the plane. However, since the magenta straight line drawing image whose drawing order is low is drawn in the place of high order, it is necessary to construct the drawing unit 1047 in a manner such that an AND drawing process of the drawing image and the background pixels is executed so that plane pixels in a shape of this portion enter an OFF state.

If the filtering process which needs various background colors such as ROP (Raster Operation) process, α blending process, or the like which needs the background is not included for the drawing images constructing the intermediate language, since not all of the color pixels of the background color are necessary, even if the banding process is independently executed every physical color, no trouble is caused. Therefore, even if the drawing is executed every physical color into the band memory for one page of the physical color and the drawing images are successively transferred to the printing apparatus, no trouble is caused in the drawing process.

In the printing apparatus of one drum or the like, since the physical color order adapted to the drum or the intermediate transfer material has been predetermined, by forming plane information of the physical colors in transferring order of the physical color draw information which is optimum to the printing apparatus, the process for rearrangement or the like of the plane information for getting the physical planes of one page which are necessary upon spatial banding in FIGS. 5A and 5B can be omitted.

If the memory for one page of one physical color which the printing apparatus has cannot be obtained in the host computer, it is also possible to reproduce the image of one page by executing the spatial banding every reproduction of the physical color plane by using the band memory which can be obtained.

In this case, coordinate calculation of the drawing image in the intermediate language is caused because of the spatial banding process. However, since it is possible to execute the reproduction every plane of the physical color in order which is optimum to the printing apparatus such as a laser beam printer or the like constructed by one drum which transfers the color onto the drum or an intermediate transfer material every physical color and executes the reproduction, as soon as the physical color plane is formed, it can be sent to the printing apparatus. Thus, it is expected that timing for starting the printing process of the printing apparatus becomes earlier than that for the spatial banding.

The invention can be applied to a system constructed by a plurality of apparatuses (for example, a host computer, an interface apparatus, a reader, a printer, and the like) or can be also applied to an apparatus (for example, a copying apparatus, a facsimile apparatus, or the like) comprising one equipment.

Naturally, the object of the invention is accomplished by a method whereby a memory medium in which software program codes called a printer driver for realizing the functions of the embodiments mentioned above have been recorded is supplied to a system or an apparatus and a host computer (or a CPU or an MPU) of the system or the apparatus reads out the program codes stored in the memory medium and executes them.

In this case, the program codes themselves read out from the memory medium realize the functions of the foregoing embodiments and the memory medium in which the program codes have been stored constructs the invention.

As a memory medium for supplying the program codes, for example, a flexible disk, a hard disk, an optical disk, a magnetooptic disk, a CD-ROM, a CD-R, a magnetic tape, a nonvolatile memory card, an ROM, or the like can be used.

Naturally, the invention incorporates not only a case where a host computer executes the read-out program codes, so that the functions of the embodiments mentioned above are realized but also a case where on the basis of instructions of the program codes, an OS (Operating System) or the like which is operating on the host computer executes a part or all of actual processes, and the functions of the embodiments mentioned above are realized by those processes.

Further, naturally, the invention incorporates a case where the program codes read out from the memory medium are written into a memory equipped for a function expanding board inserted in a host computer or a function expanding unit connected to a computer and, thereafter, on the basis of instructions of the program codes, a CPU or the like provided for the function expanding board or the function expanding unit executes a part or all of actual processes, and the functions of the embodiments mentioned above are realized by those processes.

In the case of applying the invention to the memory medium, the program codes corresponding to the flowcharts described above are stored in the memory medium.

As many apparently widely different embodiments of the present invention can be made without departing from the spirit and scope thereof, it is to be understood that the invention is not limited to the specific embodiments thereof except as defined in the appended claims.

As described above, according to the invention, if the filtering process which needs various background colors such as ROP (Raster Operation) process, α blending process, or the like which needs the background is not included for the drawing images constructing the intermediate language, the following effects are obtained.

1. As compared with the spatial banding in which the drawing image of one page is divided into a plurality of spaces and the banding is executed, there is no need to execute the coordinate converting process of every band to the drawing image constructing the intermediate language. The calculation load at the time of the banding reproduction can be reduced.

2. Since it is possible to execute the reproduction every plane of the physical color in order which is optimum to the printing apparatus such as a laser beam printer or the like constructed by one drum which transfers the color onto the drum or an intermediate transfer material every physical color and executes the reproduction, as soon as the physical color plane is formed, it can be sent to the printing apparatus. Thus, it is expected that timing for starting the printing process of the printing apparatus becomes earlier than that for the spatial banding.

Since the drawing which needs to obtain the background information which does not satisfy the foregoing condition is used only for a document to which a special filtering process such as transmitting process, gradation, or the like is applied, it is generally considered that a frequency of its appearance is low in a document whose use frequency is high.

What is claimed is:

1. A print processing method in a data processing apparatus which communicates with a printing apparatus via a predetermined communication medium and which generates print data to be printed in the printing apparatus, comprising:
   a spooling step of converting a draw command which is transferred from basic software into an intermediate language in a format in which it can be stored;
   an intermediate language storing step of holding the intermediate language formed in said spooling step;
   a spatial banding drawing step of draw-developing a draw command of the intermediate language held in said intermediate language storing step for each of a plurality of band areas divided from one page, thereby completing drawing on the band areas of all physical colors provided in the printing apparatus by one banding process;
   a physical color drawing step of draw-developing a draw command of the intermediate language held in said intermediate language storing step for each physical color provided in the printing apparatus, thereby completing drawing page by page for each physical color; and
   a draw discriminating step of discriminating, prior to draw-developing in said spatial banding drawing step or said physical color drawing step, whether the intermediate language satisfies a specific condition,
   wherein switching is made between said physical color drawing step and said spatial banding drawing step such that if it is determined in said draw discriminating step that the intermediate language satisfies the specific condition, said physical color drawing step is performed and if it is determined in said draw discriminating step that the intermediate language does not satisfy the specific condition, said spatial banding drawing step is performed.

2. A method according to claim 1, wherein the specific condition includes a condition in which the intermediate language is constructed only by a drawing image the which does not need to obtain background information.

3. A method according to claim 2, wherein as the drawing image which does not need to obtain background information, there is set a condition in which a filtering process which needs various background colors of ROP (Raster Operation) process and α blending process which needs the background is not included in the intermediate language.

4. A print processing apparatus in which a printing apparatus and a data processing apparatus are connected via a predetermined communication medium and in which print data to be printed in the printing apparatus is generated, comprising:
   spooling means for converting a draw command which is transferred from basic software into an intermediate language in a format in which it can be stored;
   intermediate language storing means for holding the intermediate language formed by said spooling means;
   spatial banding drawing means for draw-developing a draw command of the intermediate language held by said intermediate language storing means for each of a plurality of band areas divided from one page, thereby completing drawing on the band areas of all physical colors provided in the printing apparatus by one banding process;
   physical color drawing means for draw-developing a draw command of the intermediate language held by said intermediate language storing means for each physical color provided in the printing apparatus, thereby completing drawing page by page for each physical color; and
   draw discriminating means for discriminating, prior to draw-developing by said spatial banding drawing means or said physical color drawing means, whether the intermediate language satisfied a specific condition,
   wherein switching is made between said physical color drawing means and said spatial banding drawing means such that if it is determined by said draw discriminating means that the intermediate language satisfies the specific condition, said physical color drawing means performs its draw-developing and if it is determined in said draw discriminating step that the intermediate language does not satisfy the specific condition, said spatial banding drawing means performs its draw-developing.

5. An apparatus according to claim 4, wherein the specific condition includes a condition in which the intermediate language is constructed only by a drawing image which does not need to obtain background information.

6. An apparatus according to claim 5, wherein as the drawing image which does not need to obtain background information, there is set a condition in which a filtering process which needs various background colors of ROP (Raster Operation) process and α blending process which needs the background is not included in the intermediate language.

7. A computer-readable storage medium storing a computer-executable program for a print processing method in a data processing apparatus which communicates with a printing apparatus via a predetermined communication medium and which generates print data to be printed in the printing apparatus, wherein said program allows a computer to execute:
   a spooling step of converting a draw command which is transferred from basic software into an intermediate language in a format in which it can be stored;
   an intermediate language storing step of holding the intermediate language formed in said spooling step;
   a spatial banding drawing step of draw-developing a draw command of the intermediate language held in said intermediate language storing step for each of a plurality of band areas divided from one page, thereby completing drawing on the band areas of all physical colors provided in the printing apparatus by one banding process;
   a physical color drawing step of draw-developing a draw command of the intermediate language held in said intermediate language storing step for each physical color provided in the printing apparatus, thereby completing drawing page by page for each physical color; and
   a draw discriminating step of discriminating, prior to draw-developing in said spatial banding drawing step or said physical color drawing step, whether the intermediate language satisfies a specific condition, wherein switching is made between said physical color drawing step and said spatial banding drawing step such that if it is determined in said draw discriminating step that the intermediate language satisfies the specific condition, said physical color drawing step is performed and if it is determined in said draw discriminating step that the intermediate language does not satisfy the specific condition, said spatial banding drawing step is performed.

8. A computer-readable storage medium according to claim 7, wherein the specific condition includes a condition in which the intermediate language is constructed only by a drawing image which does not need to obtain background information.

9. A computer-readable storage medium according to claim 8, wherein as the drawing image which does not need to obtain background information, there is set a condition in which a filtering process which needs various background colors of ROP (Raster Operation) process and α blending process, which needs the background is not included in the intermediate language.

* * * * *